(12) United States Patent
Medles (10) Patent No.: US 9,184,807 B2
(45) Date of Patent: Nov. 10, 2015

(54) MIMO RECEIVER HAVING IMPROVED SIR ESTIMATION AND CORRESPONDING METHOD

(75) Inventor: Abdelkader Medles, Princes Mews Royston (GB)

(73) Assignee: ICERA INC., Wilmington, DE (US)

( * ) Notice: Subject to any disclaimer, the term of this patent is extended or adjusted under 35 U.S.C. 154(b) by 1022 days.

(21) Appl. No.: 13/128,351

(22) PCT Filed: Jun. 18, 2009

(86) PCT No.: PCT/EP2009/057566
§ 371 (c)(1),
(2), (4) Date: Sep. 2, 2011

(87) PCT Pub. No.: WO2010/052037
PCT Pub. Date: May 14, 2010

(65) Prior Publication Data
US 2011/0305262 A1    Dec. 15, 2011

(30) Foreign Application Priority Data
Nov. 10, 2008    (GB) .................... 0820535.3

(51) Int. Cl.
  *H04B 7/02*    (2006.01)
  *H04B 7/04*    (2006.01)
  *H04B 7/06*    (2006.01)

(52) U.S. Cl.
  CPC ............ *H04B 7/0417* (2013.01); *H04B 7/0632* (2013.01)

(58) Field of Classification Search
  CPC .............. H04B 7/02; H04L 1/02; H04L 1/04; H04L 1/00; H04L 1/06

USPC ..................... 375/267, 147, 259, 285
  See application file for complete search history.

(56) References Cited

U.S. PATENT DOCUMENTS

| | | | |
|---|---|---|---|
| 5,852,630 A | * | 12/1998 | Langberg et al. ............. 375/219 |
| 7,174,178 B2 | | 2/2007 | Bergel |
| 7,536,158 B2 | | 5/2009 | Bottomley et al. |

(Continued)

FOREIGN PATENT DOCUMENTS

| | | |
|---|---|---|
| CN | 1399436 A | 2/2003 |
| CN | 1438781 A | 8/2003 |
| CN | 1691539 A | 11/2005 |

(Continued)

OTHER PUBLICATIONS

Chinese Office Action dated Sep. 2, 2013, Application No. 200980154095, Applicant: Nvidia Technology UK Limited, 22 pages.

*Primary Examiner* — Shuwang Liu
*Assistant Examiner* — Helene Tayong (57) ABSTRACT

A method and corresponding receiver product, the method including: receiving a plurality of data streams over a wireless multiple-input-multiple-output data channel, whereby each data stream is received at all of a plurality of receive antennas from all of a plurality of transmit antennas with a respective weighting having been applied to each stream as transmitted from each different transmit antenna; receiving a common pilot signal over a common pilot channel; receiving an indication of the weightings; extracting the individual data streams from the plurality received at the receive antennas; and using the weightings and the common pilot signal together with information regarding the extracted data streams to calculate, for each of the streams, an estimate of signal power relative to interference from the one or more others of the data streams.

26 Claims, 3 Drawing Sheets

(56) References Cited

U.S. PATENT DOCUMENTS

| | | |
|---|---|---|
| 7,697,622 B2 * | 4/2010 | Han et al. ............... 375/260 |
| 2003/0153277 A1 | 8/2003 | Ito et al. |
| 2007/0071071 A1 * | 3/2007 | Li et al. ............... 375/147 |
| 2007/0223367 A1 | 9/2007 | Wu et al. |
| 2008/0316934 A1 * | 12/2008 | Nibe ............... 370/252 |

FOREIGN PATENT DOCUMENTS

| | | |
|---|---|---|
| CN | 1957540 A | 5/2007 |
| WO | 2008060203 A1 | 5/2008 |
| WO | 2008115585 A2 | 9/2008 |
| WO | 2008132688 A2 | 11/2008 |
| WO | 2010052037 A1 | 5/2010 |

* cited by examiner

| Antenna 1 | S | S | S | S | S | S | S | S | S ... |
|---|---|---|---|---|---|---|---|---|---|
| Antenna 2 | S | -S | -S | S | S | -S | -S | S | S ... |
| Symbol Index | 0 | 1 | 2 | 3 | 4 | 5 | 6 | 7 | 8 ... |

MIMO RECEIVER HAVING IMPROVED SIR ESTIMATION AND CORRESPONDING METHOD

CROSS-REFERENCE TO RELATED APPLICATION

This application is the National Stage of, and therefore claims the benefit of, International Application No. PCT/EP2009/057566 filed on Jun. 18, 2009, entitled "MIMO RECEIVER HAVING IMPROVED SIR ESTIMATION AND CORRESPONDING METHOD," which was published in English under International Publication Number WO 2010/052037 on May 14, 2010, and has a priority date of Nov. 10, 2008, based on No. GB 0820535.3. Each of the above applications is commonly assigned with this National Stage application and is incorporated herein by reference in their entirety.

FIELD OF THE INVENTION

The present invention relates to the estimation of a signal-to-interference ratio in a multiple-input-multiple-output system.

BACKGROUND

The convergence toward a packet based wireless network started to take place with the Release 5 of the WCDMA 3GPP standard, with the introduction of adaptive modulation and coding on the High Speed Physical Downlink Shared Channel (HS-PDSCH) to exploit the good channel conditions of the user equipment in order to achieve high instantaneous data rates and thus maximise the system performance. The use of multiple antennas at the base station (node-B in WCDMA terminology) and multiple antennas at the user equipment (UE) allows even higher peak rates to be achieved. To exploit this advantage, the Multiple-Input-Multiple-Output (MIMO) HS-PDSCH mode has recently been introduced in Release 7 of WCDMA 3GPP standard [3GPP TS 25.214, "Technical Specification Group Radio Access Network; Physical layer procedures (FDD)", Mars 2008, Section 9].

Figure 1A:
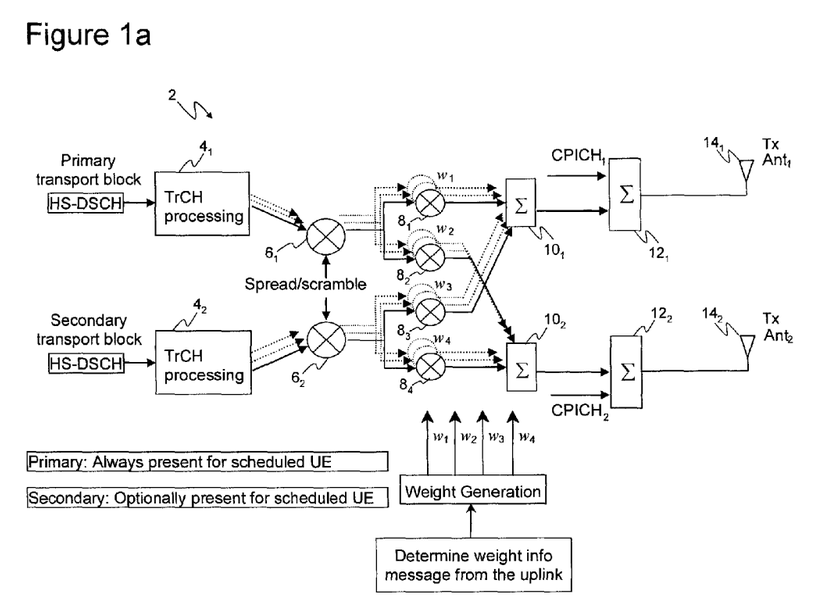
FIG. 1a is a schematic block diagram of parts of a node-B transmitter.

As shown in FIG. 1a, under Release 7 a node-B operating in MIMO mode can transmit up to two HS-PDSCH data streams, each having different antenna precoding weights, which are used to minimise the inter-stream interference at the receiver.

FIG. 1a shows a schematic block diagram of a part of a node-B transmitter 2 operable in a MIMO mode. In operation, primary transport blocks are processed through a primary transport processing module $4_1$ then multiplied by the node-B's scrambling code and the UE's spreading codes at a primary code-division multiplier $6_1$ to generate a primary HS-PDSCH stream. A first instance of the primary HS-PDSCH stream is then multiplied by a first primary weighting factor $w_1$ at a first primary weighting multiplier $8_1$ for transmission to the UE in question via a first antenna $14_1$, and a second instance of the primary HS-PDSCH stream is multiplied by a second primary weighting factor $w_2$ at a second primary weighting multiplier $8_2$ for transmission to the same UE via a second antenna $14_2$. Thus the primary HS-PDSCH stream is transmitted to the UE via both antennas $14_1$ and $14_2$ but with different weightings applied.

If the node-B scheduler has selected to transmit two HS-PDSCH streams to the UE simultaneously, then in addition secondary transport blocks are processed through a secondary transport processing module $4_2$ then multiplied by the node-B's scrambling code and the same UE's spreading code at a secondary code-division multiplier $6_1$ to generate a secondary HS-PDSCH stream. A first instance of the secondary HS-PDSCH stream is then multiplied by a first secondary weighting factor $w_3$ at a first secondary weighting multiplier $8_3$ for transmission to the UE via the first antenna $14_1$, and a second instance of the primary HS-PDSCH stream is multiplied by a second secondary weighting factor $w_4$ at a second secondary weighting multiplier $8_2$ for transmission to the same UE via the second antenna $14_2$. Thus the secondary HS-PDSCH stream is also transmitted to the UE via both antennas $14_1$ and $14_2$ with different weightings applied. The first instances of the primary and secondary HS-PDSCH streams are summed at a first initial adder $10_1$, and the second instances of the primary and secondary HS-PDSCH streams are summed at a second initial adder $10_2$. Also, the output of the first initial adder $10_1$ is summed with a first Common Pilot Channel $CPICH_1$ at a first additional adder $12_1$, and the output of the second initial adder $10_2$ is summed with a second Common Pilot Channel $CPICH_2$ at a second additional adder $12_2$.

Figure 1B:
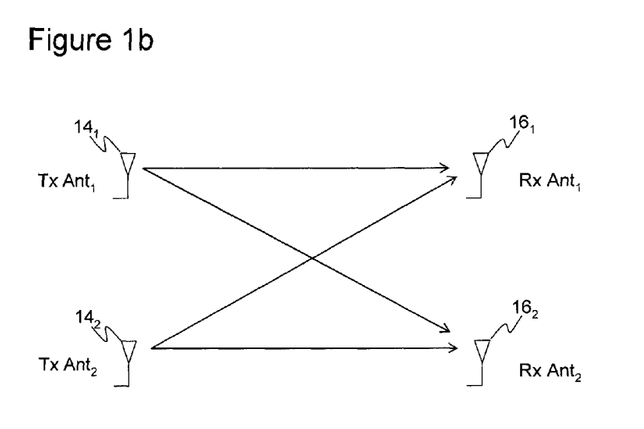
FIG. 1b is a schematic representation of MIMO transmission.

As shown schematically in FIG. 1b, each transmit antenna $14_1$ and $14_2$ transmits to each (both) receive antennas $16_1$ and $16_2$ at the UE's receiver. It is then the receiver's job to extract the two individual primary and secondary data streams from the different combinations of instances received at the two respective receive antennas $16_1$ and $16_2$.

Thus the node-B scheduler can select to transmit either one or two transport blocks to a UE in a given transport time interval, and thus is able to transmit up to two corresponding HS-PDSCH streams derived from such blocks.

Similar arrangements may be applied for transmission of other primary and secondary streams to other UEs, by multiplying by different spreading codes as will be familiar to a person skilled in the art. This is indicated in FIG. 1 by the dotted repetition of the diagram backwards into the page.

Note also that the arrangement can be generalised to any number n=1 ... N of streams and any number m=1 ... M of antennas, with each stream being transmitted from all M antennas, and each combination of stream n with antenna m being weighted by a respective weighting factor $w_{n,m}$. In a general case, the maximum number of streams transmitted need not equal the number of transmit and/or receive antennas.

The introduction of MIMO mode in the WCDMA 3GPP system requires the UE to have the capability of estimating the Signal-to-Interference Ratio (SIR) between the primary and secondary streams, in order to be able to demodulate the received signal and generate the composite PCI and CQI. The Precoding Control Indication (PCI) is an indication of the UE's preferred weights. The Channel Quality Indicator (CQI) is a metric calculated by the UE based on the estimated SIR and fed back to the node-B on the uplink. The node-B can then use the reported CQI to adjust subsequent transmissions to the UE in order to improve performance as described for example in the 3GPP specifications.

Note: noise plus interference ($\hat{P}_i^N$) includes both the interference between streams and between CDMA spreading codes (even codes of the same user). For example, in the expression $\hat{P}_i^N = \hat{P}_i^v + \hat{\gamma}\hat{I}_i^{S,CPICH}$, $\hat{P}_i^v$ is the noise plus interference between codes (by what is strictly a misnomer this is sometimes referred to just as noise), where $\hat{\gamma}\hat{I}_i^{S,CPICH}$ is the interference between streams for the same code. This terminology will be used in the description below.

The MIMO mode is thus applied to the High Speed Physical Downlink Shared Channel (HS-PDSCH) and uses precoding weights to improve performance. However, due to the precoding of the transmitted signal and in the absence of dedicated pilots on the HS-PDSCH new techniques need to be applied to estimate the SIR.

In general, when precoding weights are used, either (a) dedicated pilots are transmitted to the UE on the same physical channel as the data stream or (b) the precoding weights are signalled to the UE on a different physical channel.

The dedicated pilots are used in the closed loop transmit diversity mode 1 for the Downlink Physical Channel (DPCH) of the WCDMA 3GPP standard [3GPP TS 25.211, "Technical Specification Group Radio Access Network; Physical Channels and Mapping of Transport Channels onto Physical Channels (FDD)", December 2005, Section 5.3], and were proposed as well in [Brian Banister, "Adaptive Antenna Method and Apparatus," U.S. Pat. No. 6,952,455, filed Oct. 4, 2005]. When being used, the dedicated pilots allow direct estimation of the effective channel experienced by the data stream, which is the composite of the precoding weights and the radio channel. The dedicated pilots also allow the estimation of the SIR at the output of the receiver front end (rake processor or equaliser), which captures any imperfection introduced in the receiver processing.

Alternatively, signalling the precoding weights on a different physical channel can save some of the transmit resources that the dedicated pilots consume. However, this also has the downside that the receiver has no direct access to the effective channel experienced by the data stream, which must be instead calculated using the signalled weights and the channel estimated from the Common Pilot Channel (CPICH). The estimation of the SIR in this case is currently done by a formula using the effective channel, the noise measured on the CPICH and the calculated equaliser (or rake) coefficients [R4-070180, Signal model for multi-stream Type 3 reference receiver, Ericsson, February 2007].

Calculating the SIR by this formula does not capture the imperfection of the receiver, and in the case of MIMO is unable to evaluate the inter-stream interference due to the channel estimation errors.

SUMMARY

According to the present invention, a new method of estimation is provided that uses a common pilot channel and the MIMO downlink data channel to calculate the signal power relative to the inter-stream interference power.

According to one aspect of the present invention, there is provided a method of operating a wireless receiver, the method comprising: receiving a plurality of data streams over a wireless multiple-input-multiple-output data channel, whereby each data stream is received at all of a plurality of receive antennas of the receiver from all of a plurality of transmit antennas of a transmitter with a respective weighting having been applied to each stream as transmitted from each different transmit antenna; receiving a common pilot signal over a common pilot channel common to said receiver and one or more other receivers; receiving an indication of said weightings; extracting the individual data streams from the plurality received at said receive antennas; using said weightings and the common pilot signal together with information regarding the extracted data streams to calculate, for each of said streams, an estimate of signal power relative to interference from the one or more others of said data streams; and based on said estimates, performing at least one of the steps of: decoding said data streams, and feeding back a metric relating to channel quality from the receiver to the transmitter for use in subsequent transmission over said channel.

By performing the estimation based on information of the individual extracted data streams, the present invention advantageously captures any imperfection of the actual receiver implementation (e.g. channel estimation errors, incorrect modelling of noise, fixed point implementation, etc.) and thus improves system performance.

Further, compared to the known method of SIR calculation based on the estimated channel and equaliser coefficients, the method of the present invention can allow a reduced implementation complexity: e.g. in a preferred embodiment, it requires only a number of operations of the order of the number of CPICH symbols per slot (10 CPICH symbols/slot).

Further, the method of present invention need not require any knowledge of the noise (power or cross-antenna/time correlation) nor of the physical channels' relative powers, which makes the method very robust.

In embodiments, the calculation of said estimate may comprise calculating both the signal power and the interference power and determining the estimate of the signal power relative to the interference power therefrom.

Said estimate of signal power relative to interference power may be an estimate of signal power relative to interference power and noise power.

The calculation of said estimate may comprise calculating each of the signal power, interference power and noise power and determining the estimate of the signal power relative to the interference and noise power therefrom.

The method may comprise measuring an overall power received in each of the individual extracted data streams, and the use of said information in said calculation may comprise using said measurements of overall power.

Said calculation may comprise: (i) for each extracted data stream, using a corresponding pilot stream from the common pilot channel to generate a respective estimate of equivalent channel response for each antenna; (ii) using said estimated channel responses and said weightings to calculate estimates of signal power, noise power and interference power of the pilot streams; and (iii) using said estimates of signal power, noise power and interference power from the pilot streams together with said measurements of received power in each extracted data stream to calculate said estimates of signal power, noise power and interference power from the other data streams.

Said reception may comprise receiving only two data streams over a two-by-two wireless multiple-input-multiple-output data channel, whereby each data stream is received at both of two receive antennas of the receiver from both of two transmit antennas of the transmitter.

Said extraction of the individual data streams may comprise processing inputs from the receive antennas through one of an equaliser and rake processor.

Said calculation may be performed following de-scrambling and de-spreading of the data streams. Said calculation may be performed prior to log likelihood ratio calculation on said data streams. Said calculation may be performed prior to decoding of said data streams.

The calculation of said estimate of signal power, noise power and interference power may comprise calculating the ratio of signal power to interference plus noise power.

Said calculation may be performed without using a dedicated pilot signal for said channel by instead using said weightings, common pilot channel and information of said extracted data streams.

According to another aspect of the present invention, there is provided a computer program product comprising code which when executed on a processor will perform the steps of any of the above methods.

According to another aspect of the present invention, there is provided receiver comprising: a plurality of receive antenna for receiving a plurality of data streams over a wireless multiple-input-multiple-output data channel, whereby each data stream is received at all of said plurality of receive antennas from all of a plurality of transmit antennas of a transmitter with a respective weighting having been applied to each stream as transmitted from each different transmit antenna; and for receiving a common pilot signal over a common pilot channel common to said receiver and one or more other receivers; wherein the receiver further comprises a processing means configured to: receive an indication of said weightings; extract the individual data streams from the plurality received at said receive antennas; use said weightings and the common pilot signal together with information regarding the extracted data streams to calculate, for each of said streams, an estimate of signal power relative to interference from the one or more others of said data streams; and based on said estimates, performing at least one of the steps of: decoding said data streams, and feeding back a metric relating to channel quality from the receiver to the transmitter for use in subsequent transmission over said channel.

According to another aspect of the present invention, there is provided a corresponding user equipment.

BRIEF DESCRIPTION OF THE DRAWINGS

For a better understanding of the present invention and to show how it may be carried into effect, reference will now be made by way of example to the following drawings in which.

DETAILED DESCRIPTION OF PREFERRED EMBODIMENTS

In preferred embodiments of the present invention, there is provided a method of SIR estimation that uses the CPICH and the HS-PDSCH channels to calculate the SIR and thus to capture any imperfection in the receiver and improve system performances. Specifically, the preferred embodiments provide an improved method for MIMO SIR estimation that uses the WCDMA downlink Common Pilot Channel (CPICH), the HS-PDSCH received data and the Precoding Control Indication (PCI) signalled on the High Speed Shared Control Channel (HS-SCCH). The method exploits the structure of the received signal and estimates the SIR while inherently accounting for any imperfections of the receiver.

Referring again to FIG. 1a, the precoding weights used by the node-B (2) are signalled to the UE on the downlink HS-SCCH using the Precoding Control Indication (PCI), and are quantised as follows:

$$w_3 = w_1 = 1/\sqrt{2},$$

$$w_4 = -w_2,$$

$$w_2 \in \left\{ \frac{1+j}{2}, \frac{1-j}{2}, \frac{-1+j}{2}, \frac{-1-j}{2} \right\}.$$

The $CPICH_1$ and $CPICH_2$ are the CPICH signals transmitted on the first transmit antenna $14_1$ and the second transmit antenna $14_2$ respectively. Two CPICH modes are possible when MIMO is active. In one mode, the primary CPICH is in transmit diversity mode in which case $CPICH_1$ corresponds to the primary pilot pattern of the first transmit antenna $14_1$ and $CPICH_2$ is the primary pilot pattern of the second transmit antenna $14_2$ [3GPP TS 25.211, "Technical Specification Group Radio Access Network; Physical Channels and Mapping of Transport Channels onto Physical Channels (FDD)", December 2005, Section 5.3]. In the other mode, the primary CPICH is not in transmit diversity mode in which case a secondary CPICH is present and corresponds to the pilot signal $CPICH_2$ transmitted on the second transmit antenna $14_2$.

On a point of terminology, note that the term data channel is used herein in contrast to a pilot channel, and the terms data stream, data signal or the like are used in contrast to a pilot sequence. By data channel it is meant a channel for transmitting actual user data, i.e. information the user wishes to communicate. This is distinct from a pilot channel, which is used to transmit a predetermined, fixed pilot sequence which cannot therefore be used to transmit user data. Similarly, a data signal or data stream transmitted on a data channel is distinct from a control signal transmitted on a control channel (e.g. a PCI report), since again these do not transfer user data.

Figure 2A:
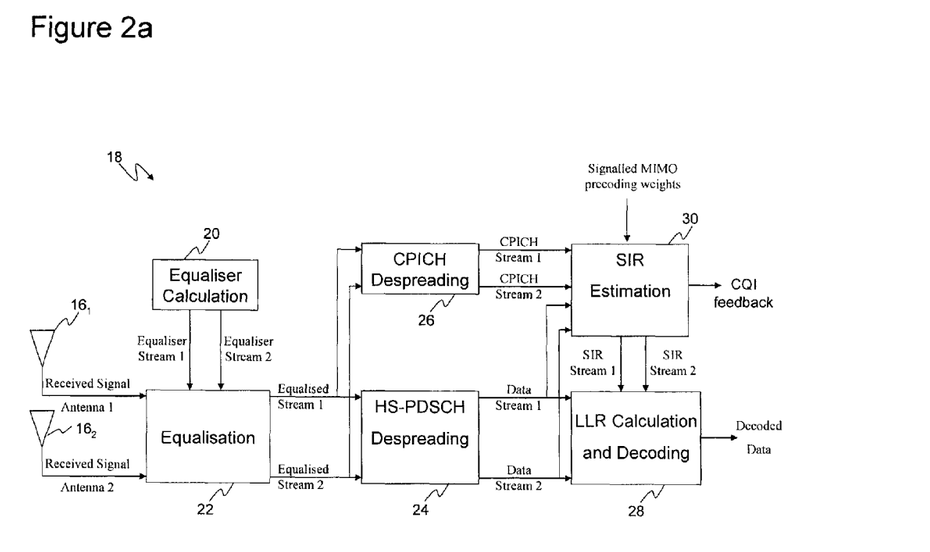
FIG. 2a is a schematic block diagram of parts of a UE receiver.

FIG. 2a shows a schematic block diagram of a part of a UE receiver 18 operable in a MIMO mode. The receiver 18 comprises the receive antennas $16_1$ and $16_2$, a double stream equaliser 22, an equaliser coefficient calculation module 20, an HS-PDSCH despreading module 24, a CPICH despreading module 26, a SIR estimation module 30 and an LLR calculation and decoding module 28. Each of the receive antennas $16_1$ and $16_2$ is coupled to a respective signal input of the equaliser 22. The equaliser 22 outputs correspond to the respective equaliser streams coupled to the respective inputs of the HS-PDSCH despreading module 24 and also to the respective inputs of the CPICH despreading module 26. The equaliser coefficient calculation module 20 outputs correspond to the equaliser streams coupled to the control inputs of the equaliser 22. The HS-PDSCH module 24 outputs correspond to the two respective equaliser streams each coupled to a respective signal input of both the SIR estimation module 30 and the LLR calculation and decoding module 28, as does the CPICH despreading module 26. The SIR estimation module 30 is coupled to receive the MIMO precoding weights signalled on the HS-SCCH control channel, and its outputs correspond to the respective streams coupled to the respective control inputs of the LLR calculation and decoding module 28. Each of the equaliser 22 and other modules 20, 24, 26, 28 and 30 are preferably software stored on a storage medium of the UE and executed on one or more central processing units (CPUs) of the UE, although each or any of them could alternatively be dedicated hardware logic-units or a combination of hardware and software.

In FIG. 2a the number of streams is maintained constant and equal to two along the receive chain. In general the number of streams could be different from two and could change along the receive chain.

In operation, each antenna receives a respective combination of the different instances of the primary and secondary data streams, and provides that combined signal as a respective input to the equaliser 22. The equaliser coefficient calculation module 20 supplies coefficients for the two equaliser streams to be output, which the equaliser 22 uses to then separates out these combined signals into the separate equaliser streams corresponding to the two data streams respectively as were first generated at the transmitter 2 prior to MIMO processing.

Note that the UE could alternatively use a rake processor instead of a chip level equalisation for signal detection. In FIG. 2a, for simplicity the use of chip level equalisation has been assumed; however the present invention applies to both chip level equalisation and rake processing. The equalisation is done using an equaliser per stream. The stream equaliser is designed to equalise the stream of interest while cancelling the interference from the other stream (in the case of double stream transmission). In the case when one stream only is transmitted, only one equaliser is applied. For simplicity, the terminology 'MIMO equaliser' may be used to refer to double stream equalisation in case of two streams being transmitted and single stream equalisation in case one stream only was transmitted.

In order to be able to decode the data streams at the output of the signal detection stage (equaliser 22 or rake) the UE needs to estimate the signal power and noise plus interference power on each stream, as shown in FIG. 2a. The interference in question is the interference between the two data streams transmitted to the same UE on the same spreading code. As mentioned above, by what is strictly a misnomer the "noise" in the following description refers to the thermal noise plus interferences from other spreading codes. Herein, the signal power of the $i^{th}$ data stream (i=1, 2) is denoted as $P_i^S$ and the interference plus noise power is denoted as $P_i^N$. The SIR is defined as the ratio between $P_i^S$ and $P_i^N$. In the following example, by estimation of the SIR it is meant the estimation of both $P_i^S$ and $P_i^N$.

The equaliser supplies the equalised streams to the respective inputs of the HS-PDSCH despreading module 24 and of the CPICH despreading module 26. By applying the relevant despreading codes, the HS-PDSCH despreading module 24 outputs the respective data streams originating from the transmitter 2, and the CPICH despreading module 26 outputs the pilot streams. The HS-PDSCH despreading module 24 supplies the respective data streams to the respective inputs of both the SIR estimation module 30 and of the LLR calculation and decoding module 28, and the CPICH despreading module 24 also supplies the pilot streams to the SIR estimation module 30.

As discussed in further detail below, according to a preferred embodiment of the present invention, the SIR estimation module 30 calculates an estimate of the SIR for each of the data streams using: (i) the signalled MIMO precoding weights received at the UE over the HS-SCCH, (ii) the CPICH streams extracted by the equaliser 22 and CPICH despreading module 26, and (iii) information of the individual data streams extracted by the equaliser 22 and HS-PDSCH despreading module 24.

The SIR estimation module 30 supplies the SIR estimates to the respective, one for each data stream, inputs of the LLR calculation and decoding block, 30 which uses these to output decoded data.

The SIR estimation block can also use the estimated SIR to determine a CQI report to feed back to the node B, which the node B can then use to adjust its subsequent transmission to improve performance in the manner known in the art.

A preferred SIR calculation having particularly improved performance is now described.

As mentioned, the preferred embodiment estimates the SIR of the MIMO HS-PDSCH channel using the CPICH signal and the HS-PDSCH data streams at the output of the MIMO equaliser, together with the knowledge of the precoding weights which comes from the decoded HS-SCCH message. The estimation is performed by the following steps.

The first step is to generate four equivalent channel responses at the output of the MIMO equaliser from the CPICH signal. The specific algorithm depends on whether a secondary CPICH is used or if the primary CPICH is in transmit diversity mode.

The second step is to use the precoding weights and the equivalent channel responses to calculate the signal, the interference and the noise powers at the output of each stream equaliser.

The third step is to use the calculated signal, interference and noise powers from the equalised CPICH together with the HS-PDSCH per-stream data in order to estimate the SIR of the HS-PDSCH equalised data streams.

A preferred example of the first step is now described in more detail, i.e. generation of four equivalent channel responses at the output of the MIMO equaliser from the CPICH. When the MIMO mode is active, in order to make channel estimation of both transmit antennas possible then either a primary CPICH is transmitted from the first antenna and a secondary CPICH from the second antenna, or the primary CPICH is in transmit diversity mode in which case a different pattern is transmitted per transmit antenna (see FIG. 2b). The symbol S in the table below is constant: $S=(1+j)/\sqrt{2}$.

Figure 2B:
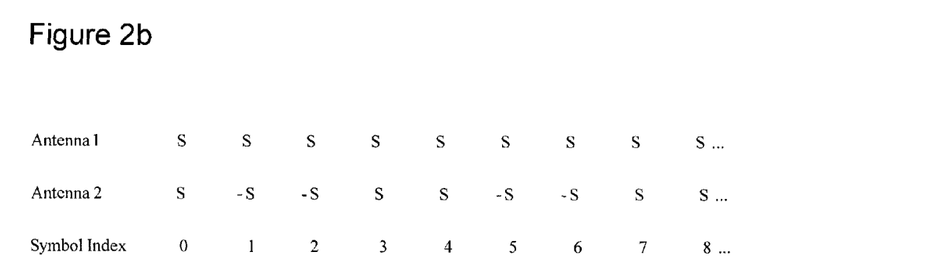
FIG. 2b is a schematic representation of the transmitted CPICH symbol sequences in transmit diversity mode.

In the case of use of the secondary CPICH, the constant pattern of symbol S is on both the primary and secondary CPICH. At the output of the $i^{th}$ stream equaliser (i=1, 2), $z_{i,1}$ and $z_{i,2}$ denote the despread primary and secondary CPICH signals at the $k^{th}$ symbol index after multiplication by the complex conjugate of S, $S^*=(1-j)/\sqrt{2}$. These can be written:

$$Z_{i,t}(k)=\alpha_{i,t}+n_{i,t}(k),$$

where $\alpha_{i,t}$ is the channel seen from antenna t at the output of the $i^{th}$ stream equaliser, and $n_{i,t}$ is an additive noise term. This noise term has the same power on both the despread primary and secondary CPICH signals:

$$P_{i,1}{}^n=P_{i,2}{}^n=P_i{}^n.$$

In the case of use of the primary CPICH transmit diversity patterns, at the output of the $i^{th}$ stream equaliser (i=1, 2), $z_i(k)$ denotes the despread CPICH signals at the $k^{th}$ symbol index, with:

$$z_i(k)=\alpha_{i,1}S+\alpha_{i,2}\xi(k)S+n_i(k),$$

where $\xi(k)=(-1)^{\lfloor(k+1)/2\rfloor}$. As can be seen from FIG. 2b, the quantity $\xi(k)$ verifies the following property:

$$\xi(2k)+\xi(2k+1)=(-1)^k+(-1)^{k+1}=0.$$

Exploiting the above property generates:

$$Z_{i,1}(k) = \frac{z_i(2k) + z_i(2k+1)}{2} \cdot S^*$$

$$Z_{i,2}(k) = \frac{\xi(2k)z_i(2k) + \xi(2k+1)z_i(2k+1)}{2} \cdot S^*,$$

which can be modelled again as:

$$Z_{i,t}(k)=\alpha_{i,t}+n_{i,t}(k),$$

although in this case the noise power is half of that of the previous case:

$$P_{i,1}^n = P_{i,2}^n = \frac{P_i^n}{2}.$$

A preferred example of the second step is now described in more detail, i.e. using the precoding weights and the equivalent channel responses to calculate the signal, the interference and the noise powers at the output of each stream equaliser. Using the equivalent channel responses at the equivalent output that were generated in the first step, combined with the precoding weights, it is possible to synthesise the effect of precoding and equalisation on each stream. Denoting by $Y_{i,l}(k)$ the synthesised response seen from each stream l at the output of the $i^{th}$ stream equaliser:

$$Y_{i,1}(k) = w_1 Z_{i,1}(k) + w_2 Z_{i,2}(k)$$

$$Y_{i,2}(k) = w_3 Z_{i,1}(k) + w_4 Z_{i,2}(k).$$

Which can be written as:

$$Y_{i,1}(k) = \beta_{i,1} + n_{i,1}(k)$$

$$Y_{i,2}(k) = \beta_{i,2} + n_{i,2}(k),$$

where $\beta_{i,1}$ (respectively $\beta_{i,2}$) are the effective channel seen by stream 1 (respectively stream 2) at the output of the $i^{th}$ stream equaliser. $n_{i,1}$ and $n_{i,2}$ are the additive noise and have the same power for both streams on the same $i^{th}$ stream equaliser output. In the case of the use of a secondary CPICH $$P_{i,1}^n = P_{i,2}^n = P_i^n,$$

where in the case of transmit diversity CPICH pattern:

$$P_{i,1}^n = P_{i,2}^n = \frac{P_i^n}{2}.$$

From this point it is possible to use any algorithm known in the art to calculate an estimate of the per-stream response $\hat{\beta}_{i,l}$; i=1,2; l=1,2 and the noise power on the CPICH $\hat{P}_i^{n,CPICH}$; i=1,2.

In case the MIMO equaliser is designed to perform a per-stream equalisation, equaliser i is designed to equalise stream i when trying to remove the contribution coming from the other stream. In this case, a signal and interference power estimates on the CPICH could be generated for each stream equaliser:

signal power $\hat{P}_1^{S,CPICH} = |\hat{\beta}_{1,1}|^2$, interference power $\hat{I}_1^{S,CPICH} = |\hat{\beta}_{1,2}|^2$. Stream equaliser 1:

signal power $\hat{P}_2^{S,CPICH} = |\hat{\beta}_{2,2}|^2$, interference power $\hat{I}_2^{S,CPICH} = |\hat{\beta}_{2,1}|^2$. Stream equaliser 2:

A preferred example of the third step is now described in more detail, i.e. calculation of the signal, interference and noise powers on the HS-PDSCH.

In the case of double stream transmission, the output of the $i^{th}$ stream equaliser (i=1, 2) and after despreading of the HS-PDSCH code the data stream signal can be written as:

$$X_i(k) = \beta_{i,1} s_1(k) + \beta_{i,2} s_2(k) + v_i(k)$$

where $s_l$ (l=1, 2) is the transmitted data symbol of $l^{th}$ stream, $v_i$ is an additive noise. The noise power at the output of the HS-PDSCH despreading is a scaled version of the one at the output of the CPICH $$P_i^v = \lambda P_i^n,$$

where the scalar λ is the ratio of the spreading factors of the CPICH and the HS-PDSCH channels. An estimate of the HS-PDSCH noise power is therefore simply a scaled version of the one obtained from the CPICH $$\hat{P}_i^{v,HS} = \lambda \hat{P}_i^{n,CPICH}; i=1,2.$$

The two transmitted data streams $s_i$ (i=1, 2) have the same power. Let γ be the power ratio between the despread data of the HS-PDSCH and the CPICH, the total power of the output of the HS-PDSCH despreading is $$P_i^{tot} = \gamma |\beta_{i,1}|^2 + \gamma |\beta_{i,2}|^2 + P_i^v.$$

An estimate of the total power per HS-PDSCH stream $\hat{P}_i^{tot}$ can be easily generated by averaging the respective signal energy.

The per-stream power γ can be estimated as follows:

$$\hat{\gamma} = \frac{\hat{P}_1^{tot} + \hat{P}_2^{tot} - \hat{P}_1^v - \hat{P}_2^v}{\hat{P}_1^{S,CPICH} + \hat{I}_1^{S,CPICH} + \hat{P}_2^{S,CPICH} + \hat{I}_2^{S,CPICH}}.$$

The signal power $P_i^S$ and the noise plus interference power $P_i^N$ on the HS-PDSCH channel for the $i^{th}$ stream can therefore be estimated as:

$$\hat{P}_i^S = \hat{\gamma} \hat{P}_i^{S,CPICH},$$

$$\hat{P}_i^N = \hat{P}_i^v + \hat{\gamma} \hat{I}_i^{S,CPICH}.$$

Note: $P^{tot}$ is the total power of the HS-PDSCH stream (including the useful signal, the interference and the noise powers): hence $P^{tot} = P^S + I + P^v$.

In the case of single stream transmission, only the equaliser of stream 1 is applied. After despreading of the HS-PDSCH code the data stream signal can be written as:

$$X_1(k) = \beta_{1,1} s_1(k) + v_1(k).$$

Since no interfering stream is present, the total power of the output of the HS-PDSCH despreading is:

$$P_1^{tot} = \gamma |\beta_{1,1}|^2 + P_1^v.$$

The signal power $P_1^S$ and the noise plus interference $P_1^N$ can therefore be estimated as:

$$\hat{P}_i^N = \hat{P}_i^v = \lambda \hat{P}_i^{n,CPICH},$$

$$\hat{P}_1^S = \hat{P}_i^{tot} - \hat{P}_i^v.$$

Figure 3:
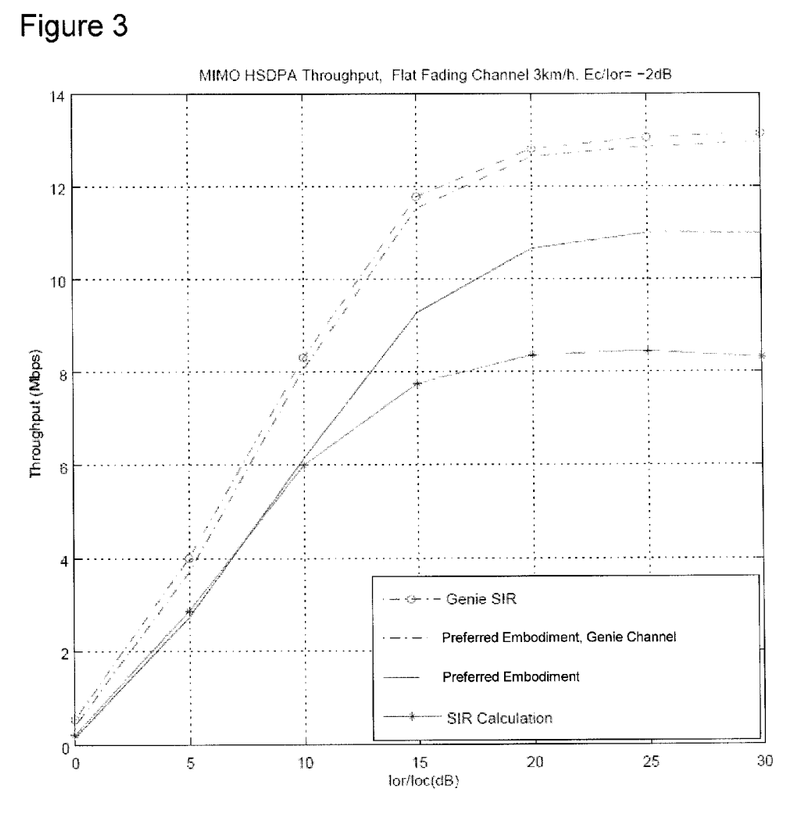
FIG. 3 is a graph of throughput performance.

To evaluate the effectiveness of the solution detailed above, simulations have been carried out. The simulations measure the MIMO HSDPA performance for the fixed reference channel described in [3GPP TS 25.101, "Technical Specification Group Radio Access Network; User Equipment (UE) Radio Transmission and Reception (FDD)", Mars 2008, Section 9.2.4A]. The primary stream uses transport block size 17548 and a 16-QAM constellation where the secondary stream uses transport block size 9719 and a QPSK constellation. Flat fading channel propagation conditions are assumed with mobile speed of 3 km/h. FIG. 3 shows the throughput performance for different cell geometries, where cell geometry is defined as the ratio between the total downlink power received from the wanted cell and the total power received by other cells. The method for SIR estimation (marked "Preferred Embodiment" in FIG. 3) is compared to the cases where the SIR is calculated by formula using the estimated channel and the equaliser coefficients ("SIR Calculation") and to the genie case where both the channel and the SIR are perfectly known to the receiver ("Genie SIR"). The curve labelled "Preferred Embodiment, Genie Channel" corresponds to the SIR estimation of the Preferred Embodiment where the channel is known perfectly to the receiver. The "Genie SIR" curve represents an upper bound to the performance of any other technique, as is apparent from FIG. 3. The "Preferred Embodiment" curve shows a gain of up to 2 Mbps in throughput compared to "SIR Calculation". This gain is achieved for middle to high geometries where MIMO transmission is likely to be employed. Comparing "Preferred Embodiment, Genie Channel" to "Genie SIR" shows that when removing the effect of the channel estimation errors the approach of the Preferred Embodiment for SIR estimation leads to a degradation of no more than 0.3 dB for most of the geometry range (0.3 Mbps degradation in throughput). This shows that the degradation of the "Preferred Embodiment" compared to "Genie SIR" is almost entirely due to the imperfect equalisation (equaliser calculation based on channel estimates which contain errors) and not to the proposed SIR estimation method. Once the SIR value has been calculated by the UE, the SIR can then be used to calculate the channel quality indicator (CQI) value, which is a metric indicative of channel conditions that is reported by the UE to the node-B. For example, in the current 3GPP specification, the CQI per stream is defined as:

$$CQI = f(SIR_{dB})$$

where the $SIR_{dB}$ is the measured SIR in decibels (i.e. $SIR_{dB} = 10 \log_{10}(SIR)$). $f(.)$ is a function that maps the $SIR_{dB}$ into CQI values, $f(.)$ could change depending on the implementation. Of course, this also means that $SIR_{dB} = 10 \log_{10}$ (Signal power) $- 10 \log_{10}$(Interference+noise), so note that calculating a ratio can mean performing a subtraction rather than a division in the case of logarithmic scale.

It will be appreciated that the above embodiments are described only by way of example. For instance, the above has been described in terms of an improvement to the 3GPP WCDMA Release 7 standard, but it will be appreciated by a person skilled in the art that the teachings disclosed herein may be applied to future LTE (Long Term Evolution) standards or to other standards or types of multiple-input-multiple-output communication. Further, it will be understood that rake processing can be used in place of an equaliser. Further, although the above has been described in terms of a two-by-two MIMO system, it will be appreciated by a person skilled in the art that the invention can be generalised to any number of streams transmitted from any number of transmit antennas to any number of receive antennas. Further, a person skilled in the art may recognise other variations on the specific equations detailed above whilst still making use of the principle of the invention as disclosed herein, including for example a different definition of CQI. Other applications and configurations may be apparent to the person skilled in the art given the disclosure herein. The scope of the invention is not limited by the described embodiments, but only be the following claims.

The invention claimed is:

1. A method of operating a wireless receiver, the method comprising:
   receiving a plurality of data streams over a wireless multiple-input-multiple-output data channel, whereby each data stream is received at all of a plurality of receive antennas of the receiver from all of a plurality of transmit antennas of a transmitter with a respective weighting having been applied to each stream as transmitted from each different transmit antenna;
   receiving a common pilot signal over a common pilot channel common to said receiver and one or more other receivers;
   receiving an indication of said weightings;
   extracting individual data streams from the plurality received at said receive antennas;
   measuring an overall power received in each of the individual data streams;
   using said weightings and the common pilot signal together with the measured overall power received in each of the extracted data streams to calculate, for each of said streams, an estimate of signal power relative to interference from the one or more others of said data streams, wherein said calculation comprises:
   (i) for each extracted data stream, using a corresponding pilot stream from the common pilot channel to generate a respective estimate of an equivalent channel response for each of the plurality of receive antennas;
   (ii) using the estimated channel responses and said weightings to calculate estimates of signal power, noise power, and interference power of the pilot streams; and
   (iii) using the estimates of signal power, noise power, and interference from the pilot streams together with the measurements of received power in each extracted data stream to calculate the estimates of signal power, noise power, and interference power from the other data streams by estimating a per data stream power by:
   calculating a signal power ratio $\hat{\gamma}$ between the pilot and the data streams, wherein:

$$\hat{\gamma} = \frac{\hat{P}_1^{tot} + \hat{P}_2^{tot} - \hat{P}_1^{\nu} - \hat{P}_2^{\nu}}{\hat{P}_1^{S,CPICH} + \hat{I}_1^{S,CPICH} + \hat{P}_2^{S,CPICH} + \hat{I}_2^{S,CPICH}},$$

and
   estimating the signal power $P_i^S$ and the noise plus interference power $P_i^N$ on the data channel for the $i^{th}$ stream as:

$$\hat{P}_i^S = \hat{\gamma} \hat{P}_i^{S,CPICH},$$

$$\hat{P}_i^N = \hat{P}_i^{\nu} + \hat{\gamma} \hat{I}_i^{S,CPICH};$$

where $P_i^{S,CPICH}$ is the signal power of the $i^{th}$ pilot stream, $I_i^{S,CPICH}$ is the interference power on the $i^{th}$ pilot stream, $P_i^{tot}$ is the overall power measured in the $i^{th}$ stream, and $P_i^{\nu}$ is the noise power in the $i^{th}$ stream; and
   based on said estimates of said signal power, noise power, and interference from the pilot streams, performing at least one of the steps of: decoding said data streams, and feeding back a metric relating to channel quality from the receiver to the transmitter for use in subsequent transmission over said channel.

2. The method of claim 1, wherein the calculation of said estimate comprises calculating both the signal power and the interference power and determining the estimate of the signal power relative to the interference power therefrom.

3. The method of claim 1, wherein said estimate of signal power relative to interference power is an estimate of signal power relative to interference power and noise power.

4. The method of claim 3, wherein the calculation of said estimate comprises calculating each of the signal power, interference power and noise power and determining the estimate of the signal power relative to the interference and noise power therefrom.

5. The method of claim 3, wherein the calculation of said estimate of signal power, noise power and interference power comprises calculating the ratio of signal power to interference plus noise power.

6. The method of claim 1, wherein said reception comprises receiving only two data streams over a two-by-two wireless multiple-input-multiple-output data channel, whereby each data stream is received at both of two receive antennas of the receiver from both of two transmit antennas of the transmitter.

7. The method of claim 1, wherein said extraction of the individual data streams comprises processing inputs from the receive antennas through one of an equaliser and rake processor.

8. The method of claim 1, wherein said calculation is performed following de-scrambling and de-spreading of the data streams.

9. The method of claim 1, wherein said calculation is performed prior to log likelihood ratio calculation on said data streams.

10. The method of claim 1, wherein said calculation is performed prior to decoding of said data streams.

11. The method of claim 1, wherein said calculation is performed without using a dedicated pilot signal for said channel by instead using said weightings, common pilot channel and information of said extracted data streams.

12. The method of claim 1, wherein step (ii) comprises calculating:

for a first pilot stream:

signal power $\hat{P}_i^{S,CPICH} = |\hat{\beta}_{1,1}|^2$, pilot interference power $\hat{I}_1^{S,CPICH} = |\hat{\beta}_{1,2}|^2$;

and for a second pilot stream:

signal power $\hat{P}_2^{S,CPICH} = |\hat{\beta}_{2,2}|^2$, and interference power $\hat{I}_2^{S,CPICH} = |\hat{\beta}_{2,1}|^2$;

wherein estimates of $\beta_{i,1}$ and $\beta_{i,2}$ are generated from $Y_{i,1}(k)$ and $Y_{i,2}(k)$ respectively:

$Y_{i,1}(k) = w_1 Z_{i,1}(k) + w_2 Z_{i,2}(k)$ $Y_{i,2}(k) = w_3 Z_{i,1}(k) + w_4 Z_{i,2}(k)$;

and which correspond to $Y_{i,1}(k) = \beta_{i,1} + n_{i,1}(k)$ $Y_{i,2}(k) = \beta_{i,2} + n_{i,2}(k)$, where $Y_{i,1}(k)$ is a synthesized response seen by stream 1 at the output of the $i^{th}$ stream equalizer, $Y_{i,2}(k)$ is a synthesized response seen by stream 2 at the output of the $i^{th}$ stream equalizer, $\beta_{i,1}$ is an effective channel seen by stream 1 at the output of the $i^{th}$ stream equalizer, $\beta_{i,2}$ is an effective channel seen by stream 2 at the output of the $i^{th}$ stream equalizer, $Z_{i,1}(k)$ is the channel response from the first antenna on the $i^{th}$ pilot stream for the $k^{th}$ symbol index, $Z_{i,2}(k)$ is the channel response from the second antenna on the $i^{th}$ stream pilot for the $k^{th}$ symbol index, $w_1 \ldots w_4$ are the weightings, and $n_{i,1}$ and $n_{i,2}$ are noise terms from the two respective antennas on the $i^{th}$ pilot stream.

13. A receiver comprising:
a plurality of receive antenna for receiving a plurality of data streams over a wireless multiple-input-multiple-output data channel, whereby each data stream is received at all of said plurality of receive antennas from all of a plurality of transmit antennas of a transmitter with a respective weighting having been applied to each stream as transmitted from each different transmit antenna; and for receiving a common pilot signal over a common pilot channel common to said receiver and one or more other receivers;

wherein the receiver further comprises a processing means configured to:
receive an indication of said weightings;
extract individual data streams from the plurality received at said receive antennas;
measure an overall power received in each of the individual data streams;
use said weightings and the common pilot signal together with the measured overall power received for each of the extracted data streams to calculate, for each of said streams, an estimate of signal power relative to interference from the one or more others of said data streams, wherein said calculation comprises:
  (i) for each extracted data stream, using a corresponding pilot stream from the common pilot channel to generate a respective estimate of an equivalent channel response for each of the plurality of receive antennas;
  (ii) using the estimated channel responses and said weightings to calculate estimates of signal power, noise power, and interference power of the pilot streams; and
  (iii) using the estimates of signal power, noise power, and interference from the pilot streams together with the measurements of received power in each extracted data stream to calculate the estimates of signal power, noise power, and interference power from the other data streams by estimating a per data stream power by:
    calculating a signal power ratio $\hat{\gamma}$ between the pilot and the data streams, wherein:

$$\hat{\gamma} = \frac{\hat{P}_1^{tot} + \hat{P}_2^{tot} - \hat{P}_1^v - \hat{P}_2^v}{\hat{P}_1^{S,CPICH} + \hat{I}_1^{S,CPICH} + \hat{P}_2^{S,CPICH} + \hat{I}_2^{S,CPICH}},$$

and estimating the signal power $P_i^S$ and the noise plus interference power $P_i^N$ on the data channel for the $i^{th}$ stream as:

$\hat{P}_i^S = \hat{\gamma} \hat{P}_i^{S,CPICH}$;

$\hat{P}_i^N = \hat{P}_i^v + \hat{\gamma} \hat{I}_i^{S,CPICH}$;

where $P_i^{S,CPICH}$ is the signal power of the $i^{th}$ pilot stream, $I_i^{S,CPICH}$ is the interference power on the $i^{th}$ pilot stream, $P_i^{tot}$ is the overall power measured in the $i^{th}$ stream, and $P_i^v$ is the noise power in the $i^{th}$ stream; and based on said estimates of said signal power, noise power, and interference from the pilot streams, performing at least one of the steps of: decoding said data streams, and feeding back a metric relating to channel quality from the receiver to the transmitter for use in subsequent transmission over said channel.

14. The receiver of claim 13, wherein the processing means is configured to calculate said estimate by calculating both the signal power and the interference power and determining the estimate of the signal power relative to the interference power therefrom.

15. The receiver of claim 13, wherein the processing means is configured to calculate said estimate of signal power relative to interference power as an estimate of signal power relative to interference power and noise power.

16. The receiver of claim 15, wherein the processing means is configured to perform said calculation of signal power, noise power and interference power by calculating the ratio of signal power to interference plus noise power.

17. The receiver of claim 15, wherein the processing means is configured to calculate said estimate by calculating each of the signal power, interference power and noise power and determining the estimate of the signal power relative to the interference and noise power therefrom.

18. The receiver of claim 13, wherein the receiver comprises only two receive antennas for receiving only two data streams over a two-by-two wireless multiple-input-multiple-output data channel, whereby each data stream is received at both of two receive antennas of the receiver from both of two transmit antennas of the transmitter.

19. The receiver of claim 13, wherein the processing means is configured to extract said individual data streams by performing one of equalisation processing and rake processing on the inputs from the receive antennas.

20. The receiver of claim 13, wherein the processing means is configured to perform said calculation following de-scrambling and de-spreading of the data streams.

21. The receiver of claim 13, wherein the processing means is configured to perform said calculation prior to log likelihood ratio calculation on said data streams.

22. The receiver of claim 13, wherein the processing means is configured to perform said calculation is prior to decoding of said data streams.

23. The receiver of claim 13, wherein the processing means is configured to perform said calculation without using a dedicated pilot signal for said channel by instead using said weightings, common pilot channel and information of said extracted data streams.

24. The receiver of claim 13, wherein the processing means is configured to perform step (ii) by calculating:

for a first pilot stream:

signal power $\hat{P}_1^{S,CPICH} = |\hat{\beta}_{1,1}|^2$, pilot interference power $\hat{I}_1^{S,CPICH} = |\hat{\beta}_{1,2}|^2$;

and
for a second pilot stream:

signal power $\hat{P}_2^{S,CPICH} = |\hat{\beta}_{2,2}|^2$, and interference power $\hat{I}_2^{S,CPICH} = |\hat{\beta}_{2,1}|^2$;

wherein estimates of $\beta_{i,1}$ and $\beta_{i,2}$) are generated from $Y_{i,1}(k)$ and $Y_{i,2}(k)$ respectively:

$Y_{i,1}(k) = w_1 Z_{i,1}(k) + w_2 Z_{i,2}(k)$ $Y_{i,2}(k) = w_3 Z_{i,1}(k) + w_4 Z_{i,2}(k)$;

and which correspond to $Y_{i,1}(k) = \beta_{i,1} + n_{i,1}(k)$ $Y_{i,2}(k) = \beta_{i,2} + n_{i,2}(k)$ where $Y_{i,1}(k)$ is a synthesized response seen by stream 1 at the output of the $i^{th}$ stream equalizer, $Y_{i,2}(k)$ is a synthesized response seen by stream 2 at the output of the $i^{th}$ stream equalizer, $\beta_{i,1}$ is an effective channel seen by stream 1 at the output of the $i^{th}$ stream equalizer, $\beta_{i,2}$ is an effective channel seen by stream 2 at the output of the $i^{th}$ stream equalizer, $Z_{i,1}(k)$ is the channel response from the first antenna on the $i^{th}$ pilot stream for the $k^{th}$ symbol index, $Z_{i,2}(k)$ is the channel response from the second antenna on the $i^{th}$ stream pilot for the $k^{th}$ symbol index, $w_{1...4}$ are the weightings, and $n_{i,1}$ and $n_{i,2}$ are noise terms from the two respective antennas on the $i^{th}$ pilot stream.

25. A user equipment comprising:
a plurality of receive antenna for receiving a plurality of data streams over a wireless multiple-input-multiple-output data channel, whereby each data stream is received at all of said plurality of receive antennas from all of a plurality of transmit antennas of a transmitter with a respective weighting having been applied to each stream as transmitted from each different transmit antenna; and for receiving a common pilot signal over a common pilot channel common to said receiver and one or more other receivers;
wherein the receiver further comprises a processing means configured to:
receive an indication of said weightings;
extract individual data streams from the plurality received at said receive antennas;
measure an overall power received in each of the individual data streams;
use said weightings and the common pilot signal together with the measured overall power received for each of the extracted data streams to calculate, for each of said streams, an estimate of signal power relative to interference from the one or more others of said data streams, wherein said calculation comprises:
(i) for each extracted data stream, using a corresponding pilot stream from the common pilot channel to generate a respective estimate of an equivalent channel response for each of the plurality of receive antennas;
(ii) using the estimated channel responses and said weightings to calculate estimates of signal power, noise power, and interference power of the pilot streams; and
(iii) using the estimates of signal power, noise power, and interference from the pilot streams together with the measurements of received power in each extracted data stream to calculate the estimates of signal power, noise power, and interference power from the other data streams by estimating a per data stream power by:
calculating a signal power ratio $\hat{\gamma}$ between the pilot and the data streams:

$$\hat{\gamma} = \frac{\hat{P}_1^{tot} + \hat{P}_2^{tot} - \hat{P}_1^{v} - \hat{P}_2^{v}}{\hat{P}_1^{S,CPICH} + \hat{I}_1^{S,CPICH} + \hat{P}_2^{S,CPICH} + \hat{I}_2^{S,CPICH}},$$

and
estimating the signal power $P_i^S$ and the noise plus interference power $P_i^N$ on the data channel for the $i^{th}$ stream as:

$\hat{P}_i^S = \hat{\gamma} \hat{P}_i^{S,CPICH}$ $\hat{P}_i^N = \hat{P}_i^{v} + \hat{\gamma} \hat{I}_i^{S,CPICH}$;

where $P_i^{S,CPICH}$ is the signal power of the $i^{th}$ pilot stream, $I_i^{S,CPICH}$ is the interference power on the $i^{th}$ pilot stream, $P_i^{tot}$ is the overall power measured in the $i^{th}$ stream, and $P_i^v$ is the noise power in the $i^{th}$ stream; and
based on said estimates of said signal power, noise power, and interference from the pilot streams, performing at least one of the steps of: decoding said data streams, and feeding back a metric relating to channel quality from the receiver to the transmitter for use in subsequent transmission over said channel.

26. A computer program product, embodied in program code stored in a non-transitory computer readable storage media which when executed on a processor will perform a method according to claim 1.

* * * * *